Figure 1:
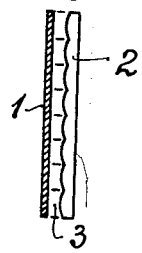

Jan. 12, 1937.  H. F. TÖNNIES  2,067,843
PHOTOELECTRIC PHOTOMETER
Filed June 1, 1934

Hans Ferdinand Tönnies

Patented Jan. 12, 1937

2,067,843

UNITED STATES PATENT OFFICE 2,067,843

PHOTOELECTRIC PHOTOMETER

Hans Ferdinand Tönnies, Altona-Grossflottbek, Germany

Application June 1, 1934, Serial No. 728,573
In Germany June 6, 1933

20 Claims. (Cl. 88—23)

The present invention relates to photo-electric photometers, that is to say photometers which are provided with a photo-electric cell connected to a galvanometer and which serve the purpose of measuring the intensity of the light included in a cone or fan of light rays having a definite magnitude. The invention is particularly advantageously applicable for photometers having a photo-electric cell which automatically converts light energy into electric energy without the aid of an electric battery. The invention can be employed for all photometers serving for the measurement of the intensity of the ray included in a cone of light rays as aforesaid, for example for photometers by means of which the time of exposure for taking photographs is estimated.

In order to measure only the intensity of those light rays which are included in a cone having a definite magnitude, it is necessary to arrange in front of the photo-electric cell a screen or stop which cuts off or screens off from the photo-electric cell all the rays which form a larger angle with the axis, i. e. which emanate from a point located too far on one side. For this purpose it has hitherto been proposed to employ an open front chamber or a number of such chambers located side by side, arranged in front of the photoelectric cell.

According to the present invention a plurality of optical refracting elements are arranged in front of the photo-electric cell, the optical refracting elements being positioned beside each other. The optical refracting elements fulfil the function of aforesaid screen or baffle chambers, the chambers—if used—being of substantially less axial length than in the hitherto known constructions.

Preferably the lenses form a single plate into which the surface of the lenses are formed for instance by having them pressed into the plate. The plate may be made of transparent material if used for visible light rays or of nontransparent material if used for nonvisible rays as infrared or ultraviolet rays.

The lenses or the lens plate present various advantages, such as, for example, those set forth below:

(1) The intensity of light acting on the photocell is, in consequence of the particular, hereinafter described, optical conditions obtained, many times greater than when the screen or baffle consists solely of chambers.

(2) The lenses can be constructed (in a manner which is particularly advantageous in practice) that they allow only those light rays which are included in a cone of rays having a definite magnitude to act upon the photo-electric cell and cut off from the said cell all the light rays coming from points outside the scope of this cone, whereby the aforesaid chambers are rendered superfluous so that a substantial simplification of the whole construction and also a further increase of the intensity of light on the photo-electric cell are obtained.

(3) The screen or baffle constituted by the lenses or the lens plate may be very thin so that the whole photometer itself presents a very flat construction and can be easily transported. As a result of its flat construction it can easily be arranged in or on a photographic camera without substantally increasing the bulk of the latter.

(4) As a consequence of the flat construction of the screen or baffle the photo-electric cell may be constructed so as to have a larger total surface without increasing the total bulk of the whole apparatus consisting of the screen and the photo-electric cell, whereby a further increase of the efficiency of the photometer is attained.

Figure 2:
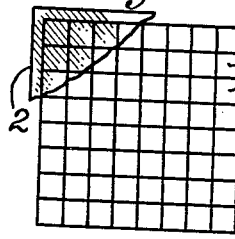
Figure 3:
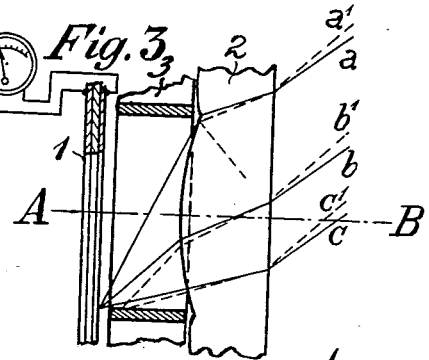

Some preferred constructional forms of the photometer according to the invention are illustrated by way of example in the accompanying drawing, in which:

Figs. 1 to 3 illustrate one constructional form according to the invention.

Figure 4:
Figure 5:
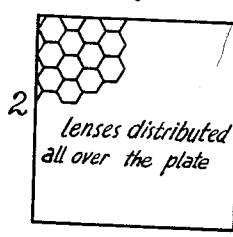
Figure 6:
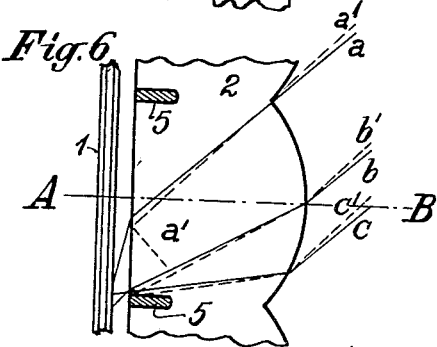
Figure 7:
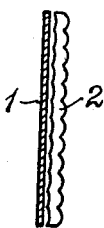
Figure 8:
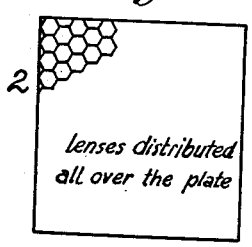
Figure 9:
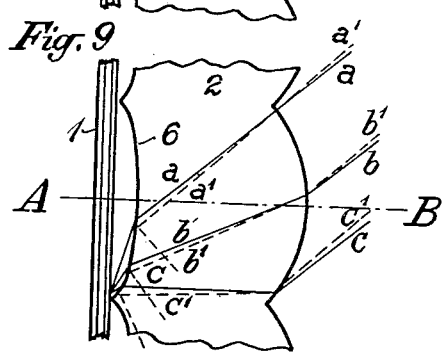
Figure 10:
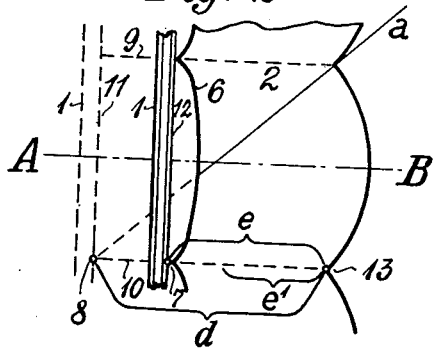
Figure 11:

Figs. 4 to 6 show a second constructional form,
Figs. 7 to 9 show a third constructional form,
Fig. 10 is a diagram illustrating the increase of light intensity on the photo-electric cell obtained according to the invention, and
Fig. 11 shows a fourth constructional form.
Figs. 3, 6 and 9 illustrate to a larger scale the mode of operation of the devices in preventing the access to the photo-electric cell of rays coming from points located too far on one side.

In the constructional form illustrated in Figs. 1 to 3 a lens plate 2 and a screen or multiple chamber baffle 3 is arranged in front of a photoelectric cell 1 which, preferably, is of the barrier layer or current generating type and has the terminals thereof connected to a sensitive current measuring instrument I. The front surface of the lens plate is plane, and the rear surface is made up of a number of lens surfaces located adjacent to one another and alined with the individual chambers of the screen 3. As shown in Fig. 2 the chambers are in this construction of quadrangular form.

By means of the lens surfaces of the plate 2 in combination with the walls of the chambers the result is obtained that all the rays of light which have an angle of incidence exceeding a definite permissible angle are prevented from reaching the photo-electric cell. The magnitude of the permissible angle is preferably such as to agree approximately with the angle of the image of an ordinary photographic camera, so that only those rays can reach the photo-electric cell which would also act to the film in the camera, whilst all rays having a greater angle of incidence are kept away from the photo-electric cell in order to prevent faulty indications of the time of exposure.

Fig. 3 illustrates the optical co-operation of the lens plate and the chambers. The light rays $a$, $b$ and $c$ represent those rays of light which have the greatest inclination to the axis A—B permissible for allowing their admission to the photo-electric cell. The said rays may, for example, be at an angle of 39° to the said axis A—B. The ray $a$ is very considerably refracted by the rear surface of the lens plate according to the sine law, whilst the ray $b$ is refracted to a lesser extent and the ray $c$ to a still lesser extent. These rays do not strike the chamber walls but are admitted to the photo-electric cell. The rays $a'$, $b'$ and $c'$ form a somewhat larger angle with the axis A—B, for example 40°. The curvature of the lens surfaces in relation to (1) The index of refraction of the transparent material of which the lens plate is composed, and (2) The distance of the front surface of the lens plate from the photo-electric cell is made such that the rays $a'$, $b'$ and $c'$ cannot strike upon the photo-electric cell, inasmuch as they are either totally reflected from the lens surfaces, as indicated for the ray $a'$, or fall upon the partition wall of a chamber and are screened off by this latter, as indicated for the rays $b'$ and $c'$.

The lenses and chambers are preferably made of hexagonal shape, inasmuch as this shape is the one (when a number of shapes are to be arranged adjacent to one another) which approximates most closely to the circular shape, and inasmuch as the angles are better illuminated than in the case of shapes having fewer and consequently more acute angles.

In the constructional form shown in Figs. 4 to 6 there is arranged in front of the photo-electric cell a lens plate, the front side of which is provided with curved lens surfaces, whilst the rear side is flat. In the said rear side the depressions 5 are formed by pressing, which depressions may be filled with a material non-transparent to light. The optical effect obtained is illustrated in Fig. 6. The rays $a$, $b$ and $c$ are at the permissible angle to the axis A—B. The ray $a$ is again very highly refracted according to the sine law from the rear side of the plate 2, whilst the rays $b$ and $c$ are less strongly refracted. The rays $a'$, $b'$ and $c'$ are at an angle which exceeds the permissible one and are accordingly either totally reflected by the rear surface of the lens plate or trapped by the intermediate partitions 5.

The constructional form which is the most important one in practice is illustrated in Figs. 7 to 9. In this constructional form the lens plate is provided both on the front side and also on the rear side with lens surfaces. If the curvatures of the lens surfaces on the front and rear sides respectively are correctly calculated—of course, taking into consideration the distance of the peaks of the lens surfaces from one another and the index of refraction of the plate—the result can be attained that nearly all the rays which make a greater angle with the axis A—B than the permissible one are totally reflected from the rear side of the plate and do not reach the photo-electric cell.

The rays $a$, $b$ and $c$ are at a permissible angle to the axis A—B of, for example, 39°, and, after being strongly refracted by the surface 6, reach the photo-electric cell. The rays $a'$, $b'$ and $c'$, on the other hand, exceed the permissible angle by, for example, 1°, and are consequently totally reflected by the surface 6 so that they cannot reach the photo-electric cell.

By means of the above-described arrangements a substantially increased illumination of the photo-electric cell and consequently an increase of the efficiency of the photometers are obtained, so that measurements may, for example, be carried out even in comparative dark places. The cause of this effect is illustrated diagrammatically in Fig. 10.

The light ray $a$ is refracted by the surface 6 in such manner that it arrives at the point 7. As is shown in Fig. 9 the incident ray having a greater angle of inclination is totally reflected. If the plate 2 were not provided the ray would arrive at the point 8. In order to screen off incident rays of greater inclination from the photo-electric cell, partitions 9, 10 would have to be provided. The photo-electric cell would therefore have to be arranged at 11, whilst in the other case it may be arranged at 12. As the photo-electric cell when arranged at 11 is located at a greater distance from the light admission opening than when it is arranged at 12, it is therefore less strongly illuminated at 11 than at 12. The ratio between the intensity of illumination on the photo-electric cell at 11 and that at 12 is approximately inversely proportional to the ratio between the square of the distance $d$ and the square of the reduced distance $e'$. The reduced distance $e'$ is calculated according to the Gullstrand law by dividing the distance $e$ by the coefficient of refraction of the medium (i. e. of the plate 2). The reduced distance $e'$ is thus obtained from the formula $$e' = \frac{e}{n}$$

The degrees of illumination in the planes 12 and 11 are thus in the ratio of $d^2$ to $e'^2$. If, for example, the distance $d=47$ (in any units) and the distance $e=32$, so that $e'=21$, then $d^2:e'^2=47^2:21^2=2209:441$, i. e. the degree of illumination at 12 is about five times as large as at 11. By this calculation only approximately correct figures are obtained, but it has been found that they agree very well with the figures obtained in practice.

From the foregoing it will be seen that the degree of illumination on the photo-electric cell obtained by the use of the lens plate is considerably greater than when only chambers are arranged in front of the photo-electric cell, as was hitherto the case. The screening effect in respect to rays of too great an inclination is existent both in the lens plate and in the chamber screening device. The lens plate operates, however, from the practical point of view differently, inasmuch as it utilizes almost without loss all the rays included in a light cone of definite angular magnitude, whilst in the case of the chamber screening device only those rays which are exactly axial can be fully utilized, the rays coming from the sides being screened off to a greater or less extent by the partitions of the chambers. By the use of the lens plate all the permissible rays are thus utilized and only the undesired rays are screened off, whereas in the case of the chamber screening device only a part of the permissible rays is utilized, whilst the permissible inclined rays coming from the object to be photographed are unnecessarily screened off to a greater or less extent according to their inclination and therefore are not measured.

The lens surface may be spherical or aspherical. In Figs. 9 and 10, for example, a rear surface 6 of aspherical form is shown.

It is also possible to use refractive surfaces of a different kind arranged adjacent to one another, such as cylindrical or prismatic surfaces.

The invention may also be applied in the manner illustrated in Fig. 11 wherein two lens plates 15, 16 are arranged in front of the photo-electric cell.

The lens plate may be made of pressed glass or other suitable material. It is particularly advantageous to make it of transparent organic material, such as, for example, artificial resin, celluloid-like material, or hardened gelatine, inasmuch as the lens elements may be produced particularly sharply and accurately in such material. The comparatively small lens elements cannot be manufactured so well with the necessary accuracy from pressed glass.

The depressions or channels in the transparent lens plate may also be arranged on the front side instead of on the rear side. The lens surfaces on the rear side of the plate will then form preferably concave planes.

If the lenses are not formed by a plate but represent single lenses, these single lenses may be kept in position by a plate of non-transparent material or other mechanical means or the lenses may be located more remote from each other in front of single photo-electric cells which are apart from each other but form an electric unity. This latter arrangement may be useful and preferred under certain conditions, for example, in order to supply a photographic or cinematographic camera with it, because every spare place of it may be made use of by single lenses before single photo-cells, the latter forming an electric unity.

Although the device according to the invention is particularly important for application in the type of photometers which are most used, namely photographic exposure meters for determining the time of exposure for still photography or the size of the diaphragm for cine photography, it can nevertheless also be used for other photometers for the measurement of the illuminating power of the light which is included in a cone of rays of a definite magnitude, for example for Luxmeters.

It will be apparent to those familiar with the design and construction of optical systems that the invention is not limited to the particular constructions herein illustrated and described, and that numerous changes may be made in the design of the optical and/or mechanical baffle systems without departure from the spirit of my invention as set forth in the following claims.

Other embodiments of combinations of optical and mechanical baffle systems for limiting the angular spread of the rays which reach the photoelectric means of a photometer or exposure meter are described and claimed in my copending continuation-in-part application, Ser. No. 50,596, filed Nov. 19, 1935.

What I claim is:

1. In photoelectric apparatus, the combination with an electrical measuring instrument and photosensitive means for impressing upon said instrument a current which varies with the illumination of said photosensitive means, of means positioned in front of said photosensitive means for restricting the angular spread of the light rays which may reach said photosensitive means, said restricting means comprising a plurality of optical refracting elements for forming the light rays approaching said photosensitive means into a plurality of separate groups of light rays which each have a limited angular spread.

2. Photoelectric apparatus as claimed in claim 1, wherein each of said optical refracting elements is of rectangular cross-section, as viewed in the direction of light rays approaching the photosensitive means.

3. Photoelectric apparatus as claimed in claim 1, wherein each of said optical refracting elements has at least one substantially plane refracting surface, the cross-section of the elements on planes parallel to their respective refracting surfaces being substantially rectangular.

4. Photoelectric means as claimed in claim 1, wherein said plurality of optical refractive elements are integrally united to form a single multiple-element plate.

5. Photoelectric means as claimed in claim 1, wherein said plurality of optical refractive elements are of rectangular cross-section and integrally united to form a single multiple-element plate.

6. In photoelectric apparatus, the combination with an electrical measuring instrument and photosensitive means for impressing upon said instrument a current which varies with the illumination of said photosensitive means, of means positioned in front of said photosensitive means for restricting the angular spread of the light rays which may reach said photo-sensitive means, said restricting means comprising a plurality of lenses for forming the light rays approaching said photosensitive means into a plurality of separate groups of light rays which each have a limited angular spread.

7. Photoelectric apparatus as claimed in claim 6, wherein said lenses are plano-convex.

8. Photoelectric apparatus as claimed in claim 6, wherein said lenses are plano-concave.

9. Photoelectric apparatus as claimed in claim 6, wherein said lenses are concavo-convex.

10. Photoelectric apparatus as claimed in claim 6, wherein said lenses are of hexagonal shape.

11. Photoelectric apparatus as claimed in claim 6, wherein said plurality of lenses constitute a single plate.

12. Photoelectric apparatus as claimed in claim 6, wherein said plurality of lenses constitute a single plate having cooperating pairs of lens surfaces at the front and rear faces thereof.

13. Photoelectric apparatus as claimed in claim 6, wherein said lenses comprise a plurality of separate and spaced lens members, and said photosensitive means comprises a plurality of sections cooperating with the several lens members.

14. Photoelectric apparatus as claimed in claim 6, wherein said plurality of lenses constitute a single plate, and the rear face of said plate is provided with channels, the side walls of said channels constituting means for intercepting a portion of the light rays of the said several groups of rays which are inclined to the axes of the lenses at more than a predetermined value.

15. In an exposure meter, the combination with an electrical measuring instrument and a photoelectric cell, of means for preventing the impingement upon said cell of light rays approaching the same from an illuminated area at more than a predetermined angle to a line normal to the outer surface of said cell, said means including a plurality of lenses in front of said cell, said lenses comprising a single plate of transparent organic material.

16. An exposure meter as claimed in claim 15, wherein said lenses are of hexagonal shape.

17. An exposure meter as claimed in claim 6, wherein said restricting means comprises walls defining a plurality of baffle chambers, certain of said chambers each cooperating with one of said lenses to form one of said groups of light rays.

18. An exposure meter as claimed in claim 6, wherein said restricting means comprises walls defining a plurality of baffle chambers, said light sensitive means being at the inner ends of and said lenses being at the outer ends of said baffle chambers.

19. In an exposure meter, the combination with an electrical measuring instrument and a current-generating cell of the barrier layer type, of a multiple chamber baffle member in front of said cell, and lens means overlying said baffle member and cooperating therewith to restrict the angular spread of the light rays which reach said cell through the several chambers of said baffle member to a value substantially less than that determined by the dimensions of said baffle chambers.

20. In an exposure meter, the combination with an electrical measuring instrument and a current-generating cell of the barrier layer type, of a multiple chamber baffle member in front of said cell, and a lens for each chamber and cooperating therewith to restrict the angular spread of the light rays which reach said cell.

HANS FERDINAND TÖNNIES.